Figure 1:
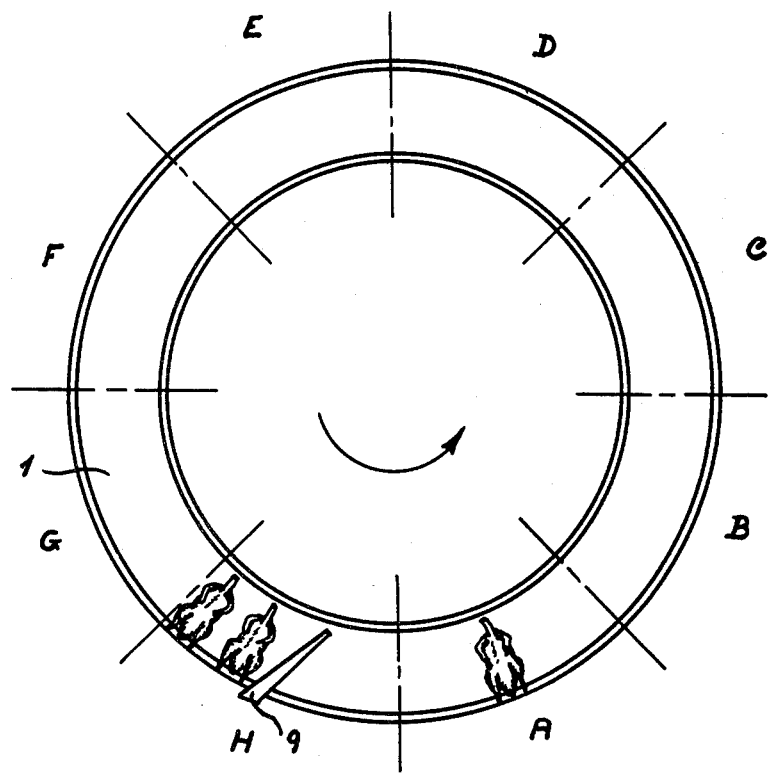

United States Patent [19]
Loth et al.

[11] 4,270,242
[45] Jun. 2, 1981

[54] APPARATUS FOR AUTOMATIC EVISCERATION OF KILLED POULTRY

[76] Inventors: Kjeld Løth; Peter Løth, both of 4, Elmegardsvej, DK-9460 Skovsgard, near Brovst, Denmark

[21] Appl. No.: 38,909

[22] Filed: May 14, 1979

Related U.S. Application Data

[62] Division of Ser. No. 859,218, Dec. 9, 1977, Pat. No. 4,208,764.

[30] Foreign Application Priority Data

Dec. 17, 1976 [DK] Denmark .............................. 5719/76
Dec. 17, 1976 [DK] Denmark .............................. 5720/76

[51] Int. Cl.³ .............................................. A22C 21/06
[52] U.S. Cl. ...................................................... 17/11
[58] Field of Search ................................. 17/11, 54, 70

[56] References Cited

U.S. PATENT DOCUMENTS

| | | | |
|---|---|---|---|
| 2,189,484 | 2/1940 | Brodeur | 17/11 |
| 2,795,814 | 6/1957 | Gaultney | 17/70 |
| 2,838,787 | 6/1958 | Hickey | 17/70 |
| 3,104,418 | 9/1963 | Segur | 17/11 |
| 3,713,189 | 1/1973 | Tkachuk | 17/70 |
| 3,750,231 | 8/1973 | Schreuder | 17/11 |
| 4,087,886 | 5/1978 | Aubert | 17/54 X |

Primary Examiner—Willie G. Abercrombie
Attorney, Agent, or Firm—Merchant, Gould, Smith, Edell, Welter & Schmidt

[57] ABSTRACT

An apparatus for automatic evisceration of killed poultry is disclosed and comprising a substantially horizontal supporting plate adapted to receive an animal lying on its back in a predetermined position in relation to the supporting plate, by providing at one free terminal edge of the supporting plate a clamping means serving to detachably secure the tail head of the animal to the supporting plate, and where the supporting plate is movable to a position opposite at least one dressing means. A tool for eviscerating the neck skin of the killed poultry by removal of windpipe, gullet and craw, said tool being characterized in that the tool has the form of a mandrel whose diameter is adapted to the opening formed by the collar bone of the animal, the outside of which mandrel is provided with projections and depressions designed to communicate with a vacuum source, and where said mandrel is both rotatable and axially displaceable for movement through the neck of the animal.

14 Claims, 9 Drawing Figures

APPARATUS FOR AUTOMATIC EVISCERATION OF KILLED POULTRY

This is a division of application Ser. No. 859,218, filed Dec. 9, 1977, now U.S. Pat. No. 4,208,764.

This invention relates to automatic evisceration of killed poultry, particularly broilers.

The prior art discloses dressing plants in which the picked and exteriorly dressed poultry is continuously or intermittently advanced along a conveyor path to be cut open and eviscerated at processing stations along the conveyor path. In this type of prior art plants the poultry to be picked, however, is suspended vertically with the shortened neck hanging down and with the legs secured for instance, in clamps connected to a conveyor chain or the like. Such an arrangement gives rise to a number of problems as, at best, the partly extracted viscera will be depending along the carcass from the open belly and therefore be in unhygienic contact with the carcass and possibly cover the liver, the appearance of which is of crucial importance in the subsequent statutory veterinary inspection. At worst, a perforated intestine will cause the visceral contents of the animal to spread over the other viscera and flow down the carcass by gravity to thereby render impossible proper health control, with the effect that an otherwise healthy animal has to be rejected.

A method for automatic evisceration of killed poultry which overcomes the aforesaid drawbacks is disclosed, and where the auxiliary equipment required in the heretobefore known plants for securing the pendulum suspended poultry is eliminated.

The method for automatic evisceration of killed poultry, particularly broilers, is characterised by clamping the animal with the belly up at its tail head to a substantially horizontal supporting plate, and eviscerating the animal in this position.

With the poultry arranged in this manner there is no longer any appreciable danger of a torn intestine soiling the other viscera and the carcass as the partly extracted viscera are supported by a skirt on the supporting plate, which will prevent the visceral contents from being pressed out by gravity. To this should be added that securing the animal specifically at its tail head is especially advantageous since the point of attachment is proximate to the area of the animal subject to the greater processing forces, viz. at the belly of the animal, without obstructing the dressing means to be passed in and out through the abdomen of the animal. Another advantage is that the animal is eviscerated with particular ease when secured in this horizontal position.

It is object of the invention to provide a plant for carrying out the method. According to the invention, this object is achieved by means of an apparatus which is characterised by comprising a substantially horizontal supporting plate adapted to receive an animal lying on its back in a predetermined position in relation to the supporting plate, by providing at one free terminal edge of the supporting plate a clamping means serving to detachably secure the tail head of the animal to the supporting plate, and where said supporting plate is movable to a position opposite at least one dressing means.

This ensures that the animal is firmly secured in the same well-defined position throughout the multi-stage dressing operation, and using the tail head as point of attachment makes it possible to employ a clamping means of extremely simple design.

According to the invention, there may be arranged in front of the free terminal edge of the supporting plate a movably mounted sensing means which in a first operative position determines the lengthwise position of the animal on the supporting plate and produces a signal for actuation of the clamping means when the animal is in the desired predetermined position on the supporting plate.

It has thus been accomplished in an advantageous manner that only one element is required firstly to determine the position of the animal lengthwise of the supporting plate, seeing that the leading surface of the sensing means forms a stop surface for the belly of the animal when said sensing means is in its operative position, secondly to actuate the clamping means when and only when the tail head of the animal is opposite the clamping means.

An apparatus designed in line with the invention may have a frictional surface to also prevent the animal secured at its tail head from moving transversely of the supporting plate in the presence of normal stresses and vibrations.

According to the invention, the supporting plate may have a depression matching the contour of the animal. This further facilitates guiding the carcass into place on the supporting plate, and any lateral movement of the animal is definitely excluded.

According to the invention, the surface of the supporting plate may be provided with guide bars extending lengthwise of the animal with a spacing adapted to a transverse measurement of the animal. By simple means there is thus achieved a strictly controlled positioning of the animal on the supporting plate and subsequent retention of the animal against lateral movement.

According to the invention, the clamping means may be designed as a bow carried through a slot formed in the supporting plate opposite the tail head of a correctly positioned animal, which bow is movable in a plane substantially at right angles to that of the supporting plate between a first position, in which the bow and the supporting plate form together an opening sufficient to permit unobstructed insertion of the triangular tail end of the animal, and a second position, in which the bow and the supporting plate form together an opening which is somewhat smaller than the cross section of the constricted area of the animals to be secured between the tail end and the carcass itself, i.e. at the tail head.

By using a bow movably upwardly and downwardly as clamping means for gripping the tail head of the animal and urging part of the animal's triangular tail end and the back portion of the carcass next to the tail head firmly against the surface of the supporting plate there is ensured firm retention of the animal without leaving any marks from retaining tools or the like.

According to the invention, the bow may define an eye opening, the top portion of which has a cross section corresponding to the tail head of the animal but which increases substantially in width downwardly through the opening. By increasing in this manner the lower portion of the eye opening there is formed in the inoperative position of the bow an opening sufficient to permit unobstructed insertion of the tail end of the animal, while in its operative clamping position the bow only forms an opening somewhat smaller than the cross section of the constricted area between the tail end of the animal and the carcass itself. To this should be added the possibility of firmly securing even animals of widely different size by means of a bow of such design as the area of attachment at the tail head will have a transversely measurement which varies only slightly between a large and a small animal, and this variation merely means that a larger or smaller excess of meat is displaced from the point of attachment.

According to the invention, the sensing means may be formed as a hook-like finger member movable in the lengthwise direction of the animal between a first operative position, in which its leading upper portion is pressed into the animal's soft belly, and a second inoperative position in which it has no contact with any part of the animal.

This allows the animal to be processed by means of successive dressing means regardless of the sensing means as the latter may be moved to be completely outside the range of the animal, once the clamping means has been actuated.

According to the invention, this finger member may be hollow and include an air passage at its leading upper portion. This makes it a simple matter to build up a signal-responsive pressure within the sensing means as the soft belly of the animal will block the air passage, with the effect that a compressed-air source connected to the hollow finger member will build up a pressure in front of a diaphragm valve also connected to the hollow finger member and which produces a signal for actuation of the clamping means.

According to the invention, the supporting plate may form a feed path or be part of such a path. This enables the animal secured to the supporting plate to be conveyed in a simple manner to the subsequent dressing means.

In a preferred embodiment the supporting plate may form, according to the invention, part of a carousel path, which ensures a compact structure suitable for incorporation into a larger plant which converts live broilers to packaged, ready-to-cook broilers.

According to the invention, the leading free marginal end of the supporting plate may be provided with a skirt inclined in relation to horizontal and adapted to support the viscera partly extracted. This skirt permits the viscera to be extracted to a greater extent from the animal without complete separation therefrom, constituting at the same time a kind of tray over which the viscera of the animal may be conveniently spread with a view to the subsequent veterinary inspection.

It is yet another object of the invention to provide a tool for eviscerating the neck skin of the killed poultry by removal of windpipe, gullet and craw, by means of which tool the said parts can be removed rapidly and efficiently without damage to the neck skin, with the effect that removal of the said parts may be incorporated in a mechanised process for evisceration of the killed animals.

According to the invention, this additional object is achieve by a tool which is characterised by having the form of a mandrel whose diameter is adapted to the opening formed by the collar bone of the animal, the outside of which mandrel is provided with projections and depressions designed to communicate with a vacuum source, and where said mandrel is both rotatable and axially displaceable for movement through the neck of the animal.

This will achieve that windpipe, gullet and craw are wound about and extracted from the neck skin as the mandrel rotates and is moved axially through the neck. By means of vacuum supplied the parts to be removed are drawn against the projections which actively grip the said parts. By continued axial displacement of the mandrel it is possible to move the severed parts away from the neck and remove same from the mandrel.

According to the invention, the projections may be formed as axially extending ribs spaced circumferentially about the mandrel, and the depressions may be formed as grooves between the ribs. There is formed in this manner well-defined carrier means and well-defined grooves for the supply of vacuum.

According to the invention, the gripping effect of the ribs may be enhanced by forming their surface with teeth, and it has been found that a particularly efficient gripping effect is achieved when, according to the invention, the axial section of the teeth is of generally rectangular configuration.

According to the invention, the mandrel may also be designed for releasable attachment to a holder, which is an advantage with a view to maintenance and cleaning. According to the invention, the mandrel holder may be hollow and adapted to be connected to a vacuum source, and the depressions of the tool may be adapted to communicate with the cavity of the holder, which simplifies the supplying of vacuum to the tool. According to the invention, the cavity of the holder may also be designed to communicate with a liquid source. This makes it possible to supply rinsing fluid to the tool through the holder and the depressions, e.g. when the tool is to be cleaned of residual material.

Furthermore, according to the invention, the tool may be associated with a tool cleaner comprising means of engagement adapted to engage at least some of the tool depressions, the tool being axially movable past said means. This enables the cleaning means to engage material taken up by the tool and retain same while by axial movement the tool is retracted from the material.

According to the invention, the tool cleaning means may be adapted to operate within a protective chamber designed to accommodate the tool by axial movement thereinto for cleaning purposes, which ensures a hygienic working operation and prevents unpleasant emission of rinsing fluid supplied for cleaning purposes.

According to the invention, a simple and sturdy embodiment of the tool cleaning means is achieved by forming these as claws whose free ends are adapted to engage the depressions.

Figure 2:
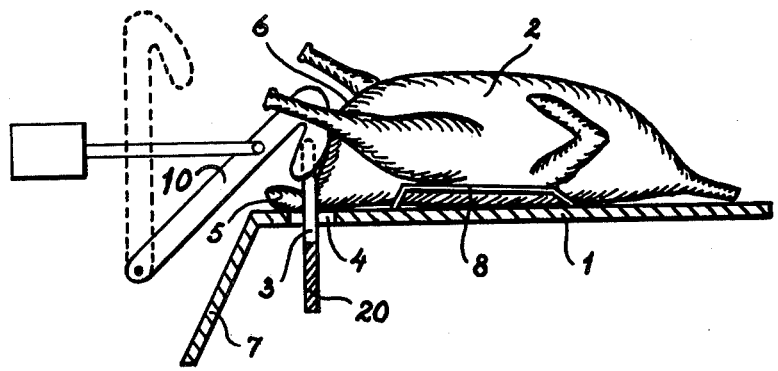
Figure 3:
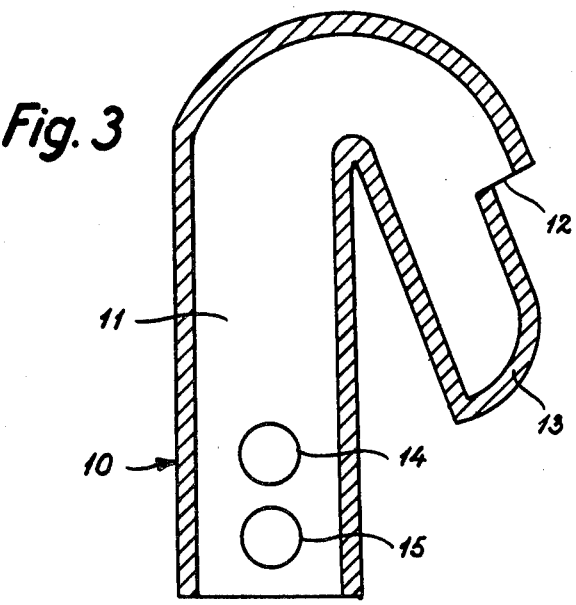
Figure 4:
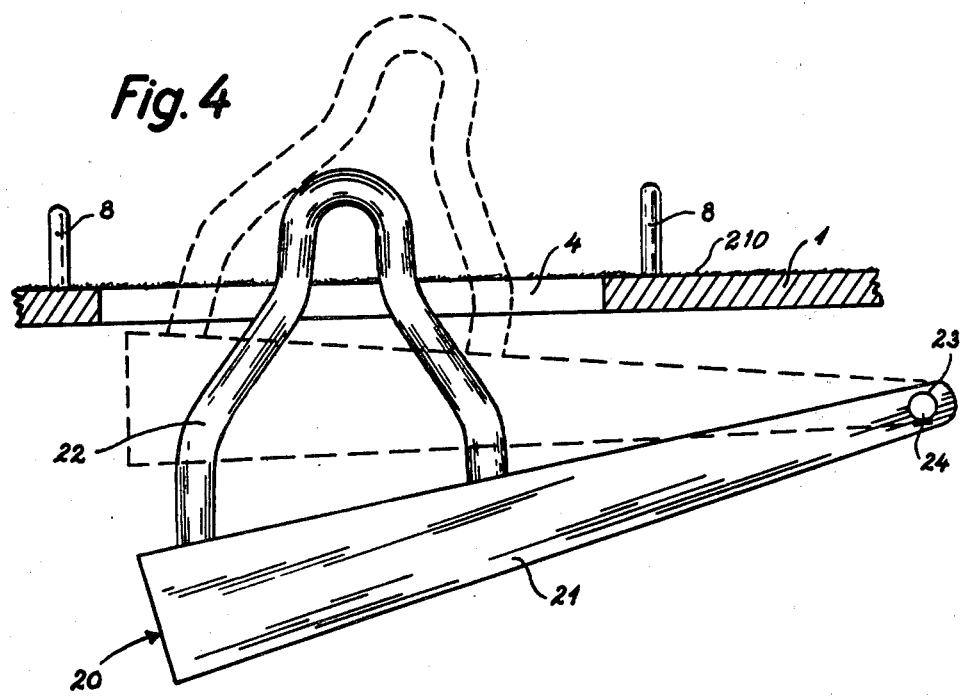
Figure 5:
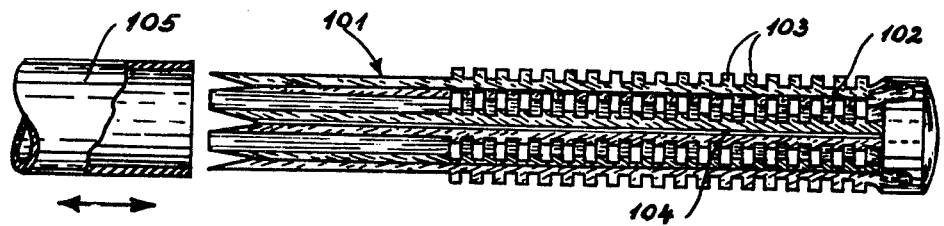
Figure 6:
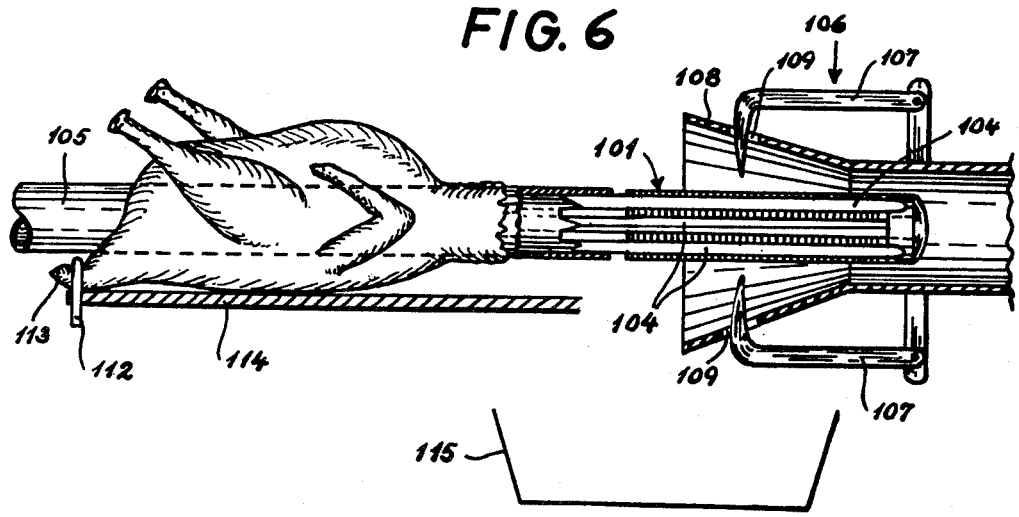
Figure 7:
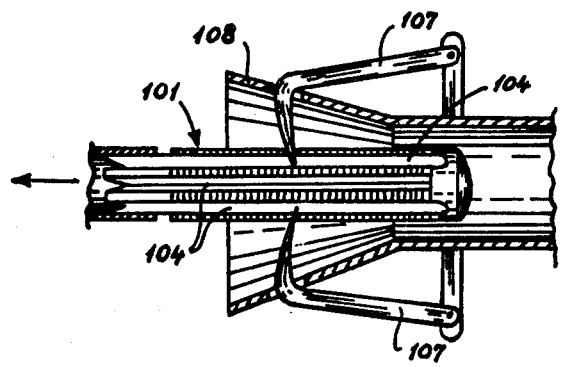
Figure 8:
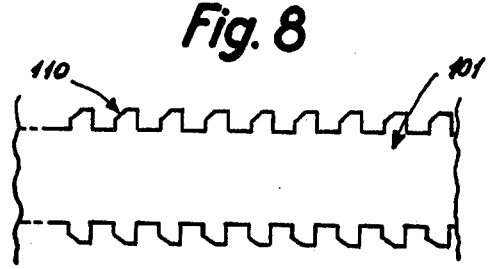
Figure 9:
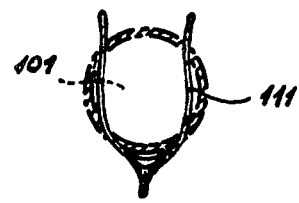

An embodiment of the apparatus and the tool according to the invention will be explained in greater detail below with reference to the drawings, in which FIG. 1 is an elevated schematic view of an apparatus designed in line with the invention, FIG. 2 shows a broiler arranged on the supporting plate immediately following actuation of the clamping means, FIG. 3 shows a sensing means according to the invention, FIG. 4 shows a clamping means according to the invention, FIG. 5 is a schematic view of an embodiment of the tool according to the invention with part of an associated tool holder partly in lateral view and partly in axial section, FIG. 6 shows the tool of FIG. 5 according to an embodiment of a protective chamber after completed cleaning, and an embodiment of tool cleaning means at rest, FIG. 7 is a schematic view of the tool cleaning means in operative position, FIG. 8 shows another embodiment of the tool projections, and FIG. 9 is a schematic view of an embodiment of the tool shown in relation to the opening formed by the collar bone of the animal.

FIG. 1 of the drawings is an elevated schematic view of an apparatus designed in line with the invention, in which the supporting plate 1 is formed as a circular carousel plate rotatable about its centre in a substantially horizontal plane. The circular plate, preferably of stainless steel, conveys the animals lying on their backs to processing stations arranged along the periphery of the carousel path.

As shown in FIG. 2, the supporting plate 1 is formed with a slot 4 opposite the tail head 3 of the correctly positioned animal 2 and through which is carried a bow 22 movable at right angles to the plane of the supporting plate, which bow 22 in a first position indicated by dash lines forms with the supporting plate 1 an opening which permits unobstructed insertion of the animal's triangular tail end 5, and which in a second position indicated by fully drawn lines firmly engages the tail head 3 of the animal. In the position indicated by fully drawn lines a pivotally mounted sensing means 10 is pressed into the animal's relatively soft belly 6 so as to block an air gap 12 formed in the front upper portion of the sensing means. The leading free terminal edge of the supporting plate is provided with a downwardly inclined skirt 7. The surface of the supporting plate includes two guide bars 8 extending lengthwise of the animal, of which only one bar is shown in FIG. 2. The surface of the supporting plate may be of frictional material 210.

The sensing means 10 appears with greater clarity from FIG. 3. The sensing means comprises a hollow body portion 11 the top of which continues into a downwardly pointed projection 13, at the front of which there is formed an air gap 12. The sensing means is formed with connecting openings 14, 15 for a compressed-air source and diaphragm valve respectively.

FIG. 4 shows an advantageous embodiment of a clamping means 20 according to the invention. This clamping means 20 comprises a bow 22 standing up from a pivot arm 21. The bow 22 and pivot arm 21 may be integral, or the bow 22 may be secured in a manner known per se to the pivot arm 21. The bow 22 encloses a substantially pear-shaped cross section, being composed of a lower portion where the opposing bow sides are generally parallel and a central portion where the opposing bow sides are inclined inwardly and upwardly to merge gradually into an upper, generally semicircular portion. In a bore 24 formed in the pivot arm a bearing bush 23 is fitted over a not shown pin secured to the supporting plate to render the pivot arm 21 movable in a plane at substantially right angles to the plane of the supporting plate. At its end opposite to the bearing point the pivot arm 21 may be connected to a not shown pneumatic cylinder piston unit which controls the upward and downward movement of the pivot arm and with that that of the bow through the slot 4.

FIG. 5 shows a tool in the form of a mandrel 100 having a plurality of ribbed projections 102 extending axially of the mandrel. The outer surface of the ribs is provided with teeth 103, the axial section of which is of generally rectangular configuration. The ribs 102 are spaced circumferentially about the mandrel and define grooves 104 formed between the ribs. The mandrel 100 is designed for releasable insertion into a tubular mandrel holder 105 which is rotatable and axially movable. As indicated, the grooves 104 terminate at the left end of the mandrel so as to be in communication with the cavity of the mandrel holder 105 with the tool inserted into the holder. The mandrel holder 105 is connected to a not shown vacuum source and a not shown source of rinsing fluid.

FIG. 6 shows in addition a tool cleaner 106. It comprises claw-like cleaning means 107 which from their position at rest shown in FIG. 6 can be moved into the operative position shown in FIG. 7 in which the free ends of the claws engage the grooves 104 of the tool.

FIG. 6 further shows a protective chamber in the form of a funnel-shaped shield 108 into which by axial movement the mandrel 100 can be inserted past the cleaning means 107, whose free ends project through slots 109 in the shield walls. In the example shown the number of grooves 104 is greater than that of claws 107, but their number may also be even.

FIG. 8 shows a cross-sectional configuration of the teeth 103 where one side of the teeth is bevelled at 110.

FIG. 9 is a schematic view of an opening formed by the collarbone 111 of the animal and of an embodiment of the mandrel 100 in opposite relationship to the opening. The diameter of the mandrel 100 is usually selected so that it will pass through the collar bone opening in close fitting relationship, possibly subject to a moderate increase of the opening to ensure firm engagement with the parts to be removed from the neck. By virtue of the application of vacuum the tool, however, will also function as intended in case the opening is somewhat larger.

The mode of operation of the apparatus will be further explained below. The killed and picked broiler, from which the head and outermost leg joints have been removed, is guided into position on the supporting plate whereby the belly of the animal lying on its back is pressed into sealing engagement around the air gap of the sensing means. The interior of the sensing means is connected to a compressed-air source, and so long as the air gap is free, i.e. with no animal opposite the sensing means in question, and it is in its operative position, air will flow through the air gap. As the air gap is blocked by the correctly positioned animal a pressure builds up in the sensing means and is transmitted to a diaphragm valve communicating with the interior of the sensing means. The diaphragm valve now produces a signal which via a pneumatic one-way valve connects the working cylinder to a compressed-air source to cause the piston to move forward within its associated cylinder. This will move the pivot arm connected to the cylinder downwardly, and the bow secured to the pivot arm firmly engages the tail head of the animal and thereby secures the animal to the supporting plate (A). The circular carousel plate is now advanced to a station (B) where the rectum of the animal is cut loose in a manner known per se by a rotary cutter, and where the belly of the animal is opened by a rectilinear incision laid from the anus up to the area of the animal's breastbone. The carousel plate is then advanced to another station (C) where the length of the animal is sensed by means of a sensing unit co-operating with an intestinal extraction means whereby the latter is caused to perform a reciprocating movement so adapted that the animal's viscera and innards are extracted just enough to leave them spread out on the skirt connected to the supporting plate and without being completely separated from the animal, whereupon the carousel plate is advanced to step (D) where in each case there is made a statutory veterinary inspection of the animal, the viscera in particular being subjected to a visual inspection. From this step the animal is advanced on the carousel plate to another step (E) where the partly extracted viscera are cut off with a view to subsequent manual sorting into edible and inedible parts. The carousel plate is finally taken to step (F) where a rotating mandrel member (i.e. the tool according to the invention) inserted from the hind part of the animal is forced through its neck to remove windpipe and gullet and associated organs. After being advanced to yet another station (G) where the lungs of the animal are evacuated in a manner known per se by means of a mandrel member connected to a vacuum source, the animal lying on the carousel plate is finally brought to a station (H) where the clamping means is released and the animal is then moved away from the supporting plate along a guide bar 9 arranged transversely of the travelling path. Throughout the process the clamped animal is in a well-defined initial position for dressing tools, etc., with the effect that also in case of using any automatic sensing means they are capable of performing the best possible dressing, also where the animals vary in size.

The tool according to the invention operates as follows:

The killed animal, from which the viscera have been removed beforehand, is secured in a suitable initial position, e.g. lying down, as shown, with the belly up, the animal being secured to the supporting plate by means of the bow engaging the tail head thereof.

By axial displacement of the mandrel holding 105 the mandrel is then inserted from behind through the abdominal incision towards the neck, and rotation of the tool is initiated together with the supply of vacuum.

In the region of the collar bone there is usually left in the throat a piece of intestine which used to connect the craw to the stomach and is now hanging from the craw.

Upon rotation the projections of the mandrel will usually first engage the said piece of intestine to initiate winding craw, gullet and windpipe onto the mandrel as the latter, while rotating, moves axially through the neck. Furthermore, by means of the vacuum supplied the said parts will firmly adhere to the mandrel. The mandrel now extracts the parts from the neck skin, and it has been found that the operation of the tool is sufficiently "gentle" to prevent damage to the neck skin.

After passing through the neck the mandrel 100 is moved to be free thereof and is passed between the claws 107 as indicated in FIG. 6. Rotation is stopped and the vacuum disconnected. The claws are moved to the operative position shown in FIG. 7 and into or preferably behind the parts taken up by the mandrel 100. The mandrel is retracted, and the claws 107 will now retain the parts taken up which, after their release from the mandrel, will drop, for instance, into a conveyor chute 115.

Flushing liquid is fed through the mandrel holder 105 and the grooves 104 after retracting the mandrel 100 to its not shown initial position on the far left-hand side of FIG. 6. The liquid is applied at a pressure sufficient to clean the grooves 104. If necessary, flushing liquid may also be supplied at other stages of the working operation.

In a practical test the above described sequence takes about six seconds.

The scope of the invention is not confined to the features shown and described above, and it is therefore possible to employ the apparatus according to the invention in conjunction with a vertically rotating conveyor belt.

What we claim is:

1. An apparatus for automatic evisceration of killed poultry comprising:
    a substantially horizontal supporting plate adapted to receive poultry lying on its back in a predetermined position in relation to the supporting plate;
    at least one processing station;
    said supporting plate being movable to a position opposite said at least one processing station; and
    clamping means provided at one free terminal edge of the supporting plate for detachably securing the tail head of the poultry to the supporting plate, said clamping means including a bow carried throug a slot formed in the supporting plate opposite the tail head of a correctly positioned animal, said bow having an eye opening for receiving the tail head, said eye opening having a top portion and bottom portion, said top portion having a cross-section corresponding substantially to the tail head of the poultry, the eye opening increasing substantially in width downwardly from the top portion to the bottom portion, the bow being movable transversely of said supporting plate between a first position in which the bottom portion of the bow and the supporting plate form together an opening sufficient to permit unobstructed insertion of the triangular tail end of the poultry, and a second position in which the top portion of the bow and the supporting plate form together an opening which is somewhat smaller than the cross-section of the constricted area of the poultry to be secured between the tail end the the carcass.

2. An apparatus for automatic evisceration of killed poultry comprising:
    a substantially horizontal supporting plate adapted to receive poultry lying on its back in a predetermined position in relation to the supporting plate;
    at least one processing station;
    said supporting plate being movable to a position opposite said at least one processing station;
    clamping means provided at one free terminal edge of the supporting plate for detachably securing the tail head of the poultry to the supporting plate; and
    movably mounted sensing means arranged in front of the free terminal edge of the supporting plate for determining in a first operative position the lengthwise position of the poultry on the supporting plate and for producing a signal for actuation of the clamping means when the poultry is in the desired predetermined position on the supporting plate;
    said sensing means including a finger member having a leading upper portion, the finger member having a hollow interior with an inlet opening for connection to a compressed air source and an outlet gap at said leading upper portion, the finger member being movable in the lengthwise direction of the poultry between a first operative position such that the leading upper portion is pressed into the poultry's soft belly of a positioned poultry and the outlet gap is blocked, and a second inoperative position such that the finger member is away from any part of the poultry.

3. An apparatus according to claim 2 wherein said finger member is hook-like in configuration having a generally upwardly extending portion and a downwardly pointing projection extending therefrom and forming said leading upper portion, said outlet gap being formed at a front of said downwardly pointing projection.

4. An apparatus according to claim 1, further comprising a movably mounted sensing means arranged in front of the free terminal edge of the supporting plate for determining in a first operative position the lengthwise position of the poultry on the supporting plate and for producing a signal for actuation of the clamping means when the poultry is in the desired predetermined position on the supporting plate.

5. An apparatus according to claim 4 wherein the sensing means comprises a hooklike finger member having a leading upper portion, the finger member being movable in the lengthwise direction of the poultry between a first operative position, such that the leading upper portion is pressed into the poultry's soft belly, and a second inoperative position such that the finger member is away from any part of the poultry.

6. An apparatus according to claim 5 wherein the finger member is hollow and includes an air passage formed in the leading upper portion.

7. An apparatus according to claim 2 wherein the clamping means comprises a bow carried through a slot formed in the supporting plate opposite the tail head of a correctly positioned poultry, the bow being movable in a plane substantially at right angles to that of the supporting plate between a first position in which the bow and the supporting plate form together an opening sufficient to permit unobstructed insertion of the triangular tail end of the poultry, and a second position in which the bow and the supporting plate form together an opening which is somewhat smaller than the cross section of the constricted area of the poultry to be secured between the tail end and the carcass.

8. An apparatus according to claim 7 wherein the bow comprises an eye opening having a top portion and a bottom portion, the top portion having a cross section corresponding to the tail head of the poultry, the eye opening increasing substantially in width downwardly from the top portion to the bottom portion.

9. An apparatus according to claim 1 or 2 wherein the supporting plate forms at least a part of a feed path.

10. An apparatus according to claim 9 wherein the supporting plate forms part of a carousel path.

11. An apparatus according to claim 1 or 2 wherein the supporting plae has a frictional surface.

12. An apparatus according to claim 1 or 2 wherein the supporting plate has a depression matching the contour of the poultry.

13. An apparatus according to claim 1 or 2 further comprising a pair of spaced guide members mounted on the surface of the supporting plate to receive the poultry and extending lengthwise thereof.

14. An apparatus according to claim 1 or 2 further comprising a skirt mounted on the free terminal edge of the supporting plate and being inclined in relation to the horizontal and being adapted to support the partly extracted viscera.

* * * * *